(12) United States Patent
Saito

(10) Patent No.: US 8,399,371 B2
(45) Date of Patent: Mar. 19, 2013

(54) OPTICAL GLASS

(75) Inventor: Motoaki Saito, Saitama (JP)

(73) Assignee: Fujifilm Corporation, Tokyo (JP)

( * ) Notice: Subject to any disclaimer, the term of this patent is extended or adjusted under 35 U.S.C. 154(b) by 124 days.

(21) Appl. No.: 13/161,007

(22) Filed: Jun. 15, 2011

(65) Prior Publication Data

US 2011/0306487 A1 Dec. 15, 2011

(30) Foreign Application Priority Data

Jun. 15, 2010 (JP) .................................. 2010-136660

(51) Int. Cl.
*C03C 3/066* (2006.01)
*C03C 3/068* (2006.01)

(52) U.S. Cl. .......................................... 501/78; 501/79

(58) Field of Classification Search .................... 501/78, 501/79
See application file for complete search history.

(56) References Cited

U.S. PATENT DOCUMENTS

| 6,251,813 B1 | 6/2001 | Sato |
| 6,713,419 B1 | 3/2004 | Onozawa et al. |

FOREIGN PATENT DOCUMENTS

| DE | 199 19 304 | 11/1999 |
| JP | 60-221338 | 11/1985 |
| JP | 2000-016831 | 1/2000 |
| JP | 2000-119036 | 4/2000 |
| JP | 2001-130924 | 5/2001 |

OTHER PUBLICATIONS

European Search Report—EP 11 16 9817—Dec. 13, 2011.

*Primary Examiner* — Karl Group
(74) *Attorney, Agent, or Firm* — Young & Thompson

(57) ABSTRACT

An optical glass in includes $SiO_2$, $B_2O_3$, $Al_2O_3$, BaO, CaO, ZnO, $La_2O_3$, $Gd_2O_3$, and $Y_2O_3$, each in a specific ratio. Further, the optical glass satisfies the following conditional expressions (1) and (2), taking the content of $SiO_2$ as A, the content of $B_2O_3$ as B, the content in total of $La_2O_3$, $Gd_2O_3$ and $Y_2O_3$ as C, and the content in total of $SiO_2$ and $B_2O_3$ as D.

$0.35 < A/B < 0.70$ (1)

$0.80 < C/D < 1.0$ (2)

By the above constitution, a high refractive index and low dispersibility are secured and at the same time deformation temperature (and glass transition temperature) lowers. By containing $Al_2O_3$, the glass structure is stabilized and a failure in appearance such as cloudiness in press molding is difficult to occur.

2 Claims, No Drawings

OPTICAL GLASS

CROSS-REFERENCE TO RELATED APPLICATIONS

The present application claims priority from Japanese Patent Application No. 2010-136660 filed on Jun. 15, 2010, the entire contents of which are incorporated herein by reference.

BACKGROUND OF THE INVENTION

1. Field of the Invention

The present invention relates to an optical glass suitable for highly precise press molding at a relatively low temperature.

2. Background Art

In recent years, digital cameras and portable telephones with a camera of taking image data by imaging device such as CCD (Charge Coupled Device) and CMOS (Complementary Metal Oxide Semiconductor) are rapidly prevailing. In particular in recent years, imaging device having a large pixel number have been developed for achieving high picture quality and, with such a tendency, high optical performance has been required of imaging lenses. On the other hand, demand for miniaturization is also increasing.

For answering such requirements, glass mold lenses press molded by means of a metallic mold having a highly precise dimension are adopted in many cases as the above imagingglenses. According to such press molding, as compared with processing by polishing, an optical lens having an aspheric surface and an optical lens of a micro-dimension can be easily and efficiently manufactured.

Since such press molding is performed at a temperature higher than the deformation temperature of the optical glass as a raw material, a metallic mold hardly subject to physical load such as heat and stress is required to have high durability. Of course, the higher the deformation temperature of the optical glass, the higher is the physical load to the metallic mold. Accordingly it is necessary to suppress the deformation temperature of the optical glass as low as possible for the purpose of lengthening the duration of the metallic mold.

On the other hand, optical glasses having a high refractive index and low dispersibility are also eagerly required to advance miniaturization and angle-widening of imagingglenses.

From such a background, some optical glasses having a relatively low deformation temperature (and a glass transition temperature) in spite of high refractive index and low dispersibility have been developed (for example, refer to JP-A-2000-16831, 2000-119036, and 2001-130924). JP-A-2000-16831, 2000-119036, and 2001-130924 disclose the optical glasses mainly consist of silicon oxide ($SiO_2$), boron oxide ($B_2O_3$), and lanthanum oxide ($La_2O_3$).

However, in recent years, miniaturization and improvement in performances of imaging lenses are conspicuously advanced and further increase in refractive index, low dispersibility, and processing easiness of the optical glass are demanded.

SUMMARY OF THE INVENTION

An object of the invention is to provide an optical glass not only having a higher refractive index and a lower dispersing value but also more excellent in quantity productivity in a glass manufacturing process and press molding property.

An optical glass in the invention comprises in % by weight: 10% or more and 17% or less of $SiO_2$, 23% or more and 30% or less of $B_2O_3$, 0.1% or more and 1% or less of $Al_2O_3$, 2% or more and 3.5% or less of $Li_2O$, 1% or more and 4% or less of BaO, 10% or more and 20% or less of CaO, 0.5% or more and 6% or less of ZnO, 22% or more and 30% or less of $La_2O_3$, 0.5% or more and 7% or less of $Gd_2O_3$, and 5% or more and 11% or less of $Y_2O_3$, and satisfying the following conditional expressions (1) and (2), $$0.35 < A/B < 0.70 \tag{1}$$

$$0.80 < C/D < 1.0 \tag{2}$$

wherein A is the content of $SiO_2$ (% by weight), B is the content of $B_2O_3$ (% by weight), C is the content in total of $La_2O_3$, $Gd_2O_3$ and $Y_2O_3$ (% by weight), and D is the content in total of $SiO_2$ and $B_2O_3$ (% by weight).

The optical glass contains each of the above components in a specific compositional ratio and, as a result, a high refractive index and low dispersibility are secured. In addition, since liquid phase temperature L.T is suppressed to 990° C. or less, devitrification due to crystallization is difficult to occur in manufacturing process of the glass, and glass structure is stably maintained and excellent quantity productivity can be obtained. Further, in press molding, a malfunction such as cloudiness ascribable to what is called micro-devitrification that is caused by the occurrence of a slight crystal on the surface of the glass when the glass is heated in a press molding temperature region higher than the deformation temperature Ts of the glass is difficultly generated. Here, the press molding temperature region means the temperature region including from the deformation temperature Ts of the glass up to the temperature exceeding Ts by 50° C. or so.

In addition to the above components, the optical glass of the invention may further comprise at least any one of $Na_2O$, $K_2O$, SrO, $ZrO_2$, $Nb_2O_5$, $WO_3$, and $Sb_2O_3$ as optional component. In that case, the content in % by weight of $Na_2O$ is 0% or more and 3% or less, the content in % by weight of $K_2O$ is 0% or more and 3% or less, the content in % by weight of SrO is 0% or more and 5% or less, the content in % by weight of $ZrO_2$ is 0% or more and 4% or less, the content in % by weight of $Nb_2O_5$ is 0% or more and 3% or less, the content in % by weight of $WO_3$ is 0% or more and 3% or less, and the content in % by weight of $Sb_2O_3$ is 0% or more and 1% or less.

According to an optical glass in the invention, by containing, in addition to $SiO_2$, $B_2O_3$ and $La_2O_3$ as the main components, $Al_2O_3$, $Li_2O$, BaO, CaO, ZnO, $Gd_2O_3$ and $Y_2O_3$, not only refractive index and dispersibility characteristics can be improved but also deformation temperature (and glass transition temperature) can be lowered. For example, it is possible to suppress the glass transition temperature to less than 570° C. while securing the refractive index as high as 1.68 to 1.70 at the d-line and Abbe's number exceeding 54. Since press molding at a relatively low temperature becomes possible with such an optical glass, the glass can be preferably used in the quantity production of molded lenses having high optical performance in spite of small size. Further, by the addition of a small amount of $Al_2O_3$, a malfunction such as cloudiness ascribable to micro-devitrification is difficult to be generated in press molding. In addition, since the liquid phase temperature L.T is suppressed to 990° C. or less, devitrification due to crystallization is difficult to occur in manufacturing process of the glass, and glass structure is stably maintained and excellent quantity productivity can be obtained. Further, since the optical glass in the invention does not contain conventionally used environmental harmful substances such as arsenic (As), lead (Pb), and tellurium (Te), it is preferred also in view of the environmental conservation.

DETAILED DESCRIPTION OF THE INVENTION

An embodiment will be described in detail below.

The optical glass is preferably used, for example, as imaging lenses mounted on a digital still camera and a silver salt camera, or a module camera for a portable telephone.

The optical glass contains silicon oxide ($SiO_2$), boron oxide ($B_2O_3$), aluminum oxide ($Al_2O_3$), lithium oxide ($Li_2O$), barium oxide (BaO), calcium oxide (CaO), zinc oxide (ZnO), lanthanum oxide ($La_2O_3$), gadolinium oxide ($Gd_2O_3$), and yttrium oxide ($Y_2O_3$) as the constituents, and satisfies the following conditional expressions (1) and (2). In the following conditional expressions, A is the content of $SiO_2$ (% by weight), B is the content of $B_2O_3$ (% by weight), C is the content in total of $La_2O_3$, $Gd_2O_3$ and $Y_2O_3$ (% by weight), and D is the content in total of $SiO_2$ and $B_2O_3$ (% by weight).

$$0.35 < A/B < 0.70 \quad (1)$$

$$0.80 < C/D < 1.0 \quad (2)$$

By containing each of the constitutional components described above and satisfying the conditional expressions (1) and (2), not only glass transition temperature Tg and deformation temperature Ts can be suppressed to lower values but also a higher refractive index and lower dispersibility can be obtained. In addition, a glass structure can be stably maintained, and malfunctions from the manufacturing point of view such as devitrification in manufacturing process of the glass and cloudiness in press molding are difficult to occur. In conditional expression (1), by bringing A/B into the range of 0.35 or more and 0.70 or less, the structural skeleton of the glass is most stabilized and liquid phase temperature L.T can be suppressed to 990° C. or less. Further, in conditional expression (2), when C/D is 0.80 or less, Abbe number is liable to lower (dispersibility increases) and when C/D is 1.0 or more, the refractive index shows a tendency to lower.

Each component constituting the optical glass of the invention will be described in detail below.

$SiO_2$ is a main component to form the structural skeleton of the glass. The content of $SiO_2$ is preferably 10% by weight or more and 17% by weight or less. The glass structure is stabilized by making the content 10% by weight or more. Good solubility of the glass is maintained by making the content 17% by weight or less.

$B_2O_3$ is also a main component to form the structural skeleton of the glass. The content of $B_2O_3$ is preferably 23% by weight or more and 30% by weight or less. This is for the reason that the glass structure is stabilized by the content of 23% by weight or more, and a high refractive index is easily realized by the content of 30% by weight or less (for example, refractive index nd to the d-line of 1.68 to 1.70 or so).

$Al_2O_3$ is a component to improve stabilization of the glass structure. $Al_2O_3$ functions, by means of increasing the viscosity of glass and lowering the growth of crystal, such that a malfunction such as cloudiness ascribable to micro-devitrification is not caused when retained in a press molding temperature region. By making the content of $Al_2O_3$ 0.1% by weight or more and 1% by weight or less of the total content, the above function can be effectively exhibited. When the content of $Al_2O_3$ exceeds 1% by weight, cloudiness ascribable to micro-devitrification is rather liable to occur.

$Li_2O$ is a component mainly exhibiting an effect to lower the glass transition temperature Tg. However, an excessive addition amount is followed by the reduction of refractive index and the increase of liquid phase temperature L.T, and the glass is liable to be devitrified by crystallization in the manufacturing process of the glass. The content of $Li_2O$ is preferably 2% by weight or more and 3.5% by weight or less.

BaO exhibits an effect of stabilizing the glass structure while obtaining an optical constant of high refractive index and low dispersibility. Further, by adding the raw material in the form of $Ba(NO_3)_2$, defoaming effect can also be expected at the time of glass manufacturing by the bubble eliminated from the raw material. However, when a large amount of BaO is added, the liquid phase temperature L.T is increased to the contrary, therefore, the glass is liable to be devitrified due to crystallization in the glass manufacturing process. Accordingly, the content of BaO is preferably 1% by weight or more and 4% by weight or less for obtaining desired optical characteristics.

CaO has an extremely great effect of stabilizing the glass structure while obtaining an optical constant of high refractive index and low dispersibility. However, when CaO is added in a large amount, the liquid phase temperature L.T is increased to the contrary, therefore, the glass is liable to be devitrified due to crystallization in the glass manufacturing process. Accordingly, the content of CaO is preferably 10% by weight or more and 20% by weight or less.

ZnO exhibits a function of improving solubility of the glass. By making the content 0.5% by weight or more, solubility can be improved. Further, a high refractive index is easily realized (for example, refractive index nd to the d-line of 1.68 to 1.70 or so) by making the content 6% by weight or less. Accordingly, the content of ZnO is preferably 0.5% by weight or more and 6% by weight or less.

$La_2O_3$ is a component capable of obtaining effects to heighten the refractive index of the optical glass and at the same time to lessen the dispersibility (that is, to increase Abbe's number). Effects can be sufficiently exhibited by the content of 22% by weight or more. However, when $La_2O_3$ is added in an excessive amount, it becomes difficult to lower glass transition temperature Tg to 570° C. or less, and so the content is preferably 30% by weight or less. Accordingly, the content of $La_2O_3$ is preferably 22% by weight or more and 30% by weight or less.

$Gd_2O_3$ is a component bringing about effects to raise the refractive index of the optical glass and at the same time lessen the dispersibility (that is, to increase Abbe's number) similarly to $La_2O_3$. For obtaining the effects, it is necessary to contain at least 0.5% by weight or more of $Gd_2O_3$. However, when the content exceeds 7% by weight, the liquid phase temperature L.T is increased, therefore, the glass is liable to be devitrified due to crystallization in the glass manufacturing process. Accordingly, the content of $Gd_2O_3$ is preferably 0.5% by weight or more and 7% by weight or less.

$Y_2O_3$ is also a component to raise the refractive index and lessen the dispersibility (to increase Abbe's number). The effect can be sufficiently exhibited by making the content of $Y_2O_3$ 5% by weight or more of the total content. However, when $Y_2O_3$ is added in an excessive amount, the liquid phase temperature L.T is increased, therefore, the glass is liable to be devitrified due to crystallization in the glass manufacturing process. Accordingly, the content of $Y_2O_3$ is preferably 5% by weight or more and 11% by weight or less.

The optical glass may further contain at least any one of sodium oxide ($Na_2O$), potassium oxide ($K_2O$), strontium oxide (SrO), zirconium oxide ($ZrO_2$), niobium oxide ($Nb2O_5$), tungsten oxide ($WO_3$), and antimony oxide ($Sb_2O_3$) as optional component.

$Na_2O$ and $K_2O$ are components mainly exhibiting the effect to lower the glass transition temperature Tg similarly to Li$_2$O, they may be added as optional components. The content is preferably 0% by weight or more and 3% by weight or less, considering the adjustment of optical constant and substitution with Li$_2$O.

SrO has an effect of improving devitrification resistance while obtaining an optical constant of high refractive index and low dispersibility similarly to BaO and CaO, and can be substituted with BaO and CaO as optional components. The content of SrO is preferably 0% by weight or more and 5% by weight or less for obtaining desired optical characteristics.

ZrO$_2$ is a component to further improve refractive index. However, excessive addition is followed by deterioration of devitrification resistance. The addition amount is preferably 0% by weight or more and 4% by weight or less.

Nb$_2$O$_5$ is an effective component to obtain a high refractive index. Good solubility can be easily obtained by making the content of Nb$_2$O$_5$ 3% by weight or less of the total content.

WO$_3$ is also an effective component to obtain a high refractive index. Good solubility can be easily obtained by making the content of WO$_3$ 3% by weight or less of the total content.

Sb$_2$O$_3$ is a component having a defoaming function and a decolorizing function. The content of Sb$_2$O$_3$ is preferably 0% by weight or more and 1% by weight or less, more preferably 0.05% by weight or more and 1.0% by weight or less, still more preferably 0.05 by weight or more and 0.5% by weight or less, still more preferably 0.05% by weight or more and 0.3% by weight or less.

The optical glass can be manufactured, for example, as follows. Specifically, In the first place, a mixed raw material is obtained by mixing the raw material powder of each constitutional component described above in a specific ratio. In the next place, the mixed raw material is put in a crucible heated at about 1,100° C. to 1,350° C. by specific amounts and melted in order (melting treatment) while maintaining the temperature in the crucible. Further, while maintaining the temperature in the crucible, the molten mixed raw material is subjected to stirring over specific time (stirring treatment), and then the bubble is removed by maintaining a stationary state (clarifying treatment). Finally, the glass is flown out of the crucible while maintaining the temperature in the crucible, cast in a mold previously heated at a specific temperature, and gradually cooled to obtain the optical glass of the exemplary embodiment.

Further, when a lens is formed with the optical glass, the method is as follows. First, a preform is formed by processing the optical glass in the desired size and shape according to the size and shape of the optical device for press molding the optical glass. Next, the preform is inserted into a highly precisely processed metal mold for press molding. At this time, pressurization is performed after increasing the temperature of both of the mold and preform up to the vicinity of the deformation temperature of the preform, and then the temperature is lowered to the glass transition temperature or lower while maintaining the pressurized state. After taking the press-molded lens out of the metal mold, specific processes such as annealing are performed according to necessity, thereby the manufacture of the lens is completed.

As has been described, according to the optical glass of an exemplary embodiment, by the constitution of containing the above-described each component in a specific amount, a high refractive index and low dispersibility are secured and at the same time lowering of deformation temperature (and glass transition temperature) can be contrived. Specifically, for example, it is possible to suppress glass transition temperature Tg to 570° C. or less while securing the refractive index nd to the d-line as high as 1.68 to 1.70 and Abbe number vd exceeding 54. In addition, even when press molding is done at a temperature in the vicinity of deformation temperature Ts of the glass, cloudiness ascribable to micro-devitrification difficultly occurs. In addition, since liquid phase temperature L.T is suppressed to 990° C. or less, devitrification due to crystallization is difficultly caused in manufacturing process of the glass, and excellent quantity productivity can be obtained. Further, practicably hindered coloring and contamination of bubbles can be avoided by the addition of Sb$_2$O$_3$.

Accordingly, molded lenses having good optical characteristics can be more efficiently manufactured with such an optical glass. Further, since thermal load applied to the metal mold for use in press molding of the optical glass can be reduced, to use the optical glass in the invention is advantageous in view of lengthening the duration of life of the metal mold. Furthermore, since the optical glass in the invention does not contain environmental harmful substances such as arsenic (As), lead (Pb), and tellurium (Te), it is preferred also in view of the environmental conservation.

EXAMPLE

Specific examples of optical glass in the invention are described below.

Tables 1 and 2 show the components constituting the optical glasses (Examples 1 to 12) as the examples in the invention and the content of each component (% by weight). Further, various characteristic values of the optical glasses in Examples 1 to 12 are shown in Tables 1 and 2. Specifically, refractive index nd to the d-line, Abbe's number vd, glass transition temperature Tg (° C.), deformation temperature Ts (° C.), liquid phase temperature L.T (° C.), and hardness to be cloudy in press molding are shown.

<Evaluation Test of Hardness to be Cloudy>

Each of the lenses 1 to 12 were irradiated with light from a condensing lamp and the hardness to be cloudy were evaluated in terms of reflectance of surface according the following criteria. Samples with cloud which was not visually confirmed in areas which light transmit are ranked as "A". Samples with cloud which was visually confirmed in areas which light transmit are ranked as "B".

TABLE 1

| Component | Unit | Examples | | | | | |
| --- | --- | --- | --- | --- | --- | --- | --- |
| | | 1 | 2 | 3 | 4 | 5 | 6 |
| SiO$_2$ | % by weight | 11.0 | 11.0 | 16.0 | 12.5 | 14.0 | 13.5 |
| B$_2$O$_3$ | % by weight | 29.0 | 29.0 | 24.0 | 27.5 | 26.0 | 27.2 |
| Al$_2$O$_3$ | % by weight | 1.0 | 1.0 | 0.1 | 0.3 | 0.5 | 0.3 |
| Li$_2$O | % by weight | 2.0 | 2.0 | 2.9 | 2.7 | 3.5 | 2.5 |
| BaO | % by weight | 3.0 | 3.0 | 3.0 | 2.0 | 3.5 | 2.5 |
| CaO | % by weight | 16.0 | 19.5 | 16.0 | 10.0 | 12.0 | 16.0 |
| ZnO | % by weight | 2.9 | 1.0 | 2.9 | 5.0 | 3.0 | 2.5 |
| La$_2$O$_3$ | % by weight | 22.0 | 22.0 | 28.6 | 28.5 | 24.0 | 24.5 |

TABLE 1-continued

| Component | Unit | 1 | 2 | 3 | 4 | 5 | 6 |
|---|---|---|---|---|---|---|---|
| $Gd_2O_3$ | % by weight | 5.5 | 6.0 | 1.0 | 0.5 | 5.0 | 3.0 |
| $Y_2O_3$ | % by weight | 7.5 | 5.0 | 5.0 | 10.0 | 8.5 | 7.5 |
| $Na_2O$ | % by weight | — | — | — | — | — | — |
| $K_2O$ | % by weight | — | — | — | — | — | — |
| SrO | % by weight | — | — | — | — | — | — |
| $ZrO_2$ | % by weight | — | — | — | — | — | — |
| $Nb_2O_5$ | % by weight | — | — | — | — | — | — |
| $WO_3$ | % by weight | — | — | — | — | — | — |
| $Sb_2O_3$ | % by weight | 0.1 | 0.5 | 0.5 | 1.0 | — | 0.5 |
| Total | % by weight | 100.0 | 100.0 | 100.0 | 100.0 | 100.0 | 100.0 |
| Conditional Expression (1) | | 0.379 | 0.379 | 0.667 | 0.455 | 0.538 | 0.496 |
| Conditional Expression (2) | | 0.88 | 0.83 | 0.87 | 0.98 | 0.94 | 0.86 |
| nd | — | 1.690 | 1.685 | 1.695 | 1.690 | 1.686 | 1.689 |
| νd | — | 54.8 | 55.5 | 54.5 | 54.5 | 54.6 | 55.2 |
| Tg | °C. | 569 | 565 | 535 | 542 | 568 | 557 |
| Ts | °C. | 633 | 625 | 600 | 610 | 630 | 620 |
| Devitrification (liquid phase temperature L.T) | °C. | 980 | 985 | 985 | 975 | 980 | 960 |
| Hardness to be cloudy | — | A | A | A | A | A | A |

TABLE 2

| Component | Unit | 7 | 8 | 9 | 10 | 11 | 12 |
|---|---|---|---|---|---|---|---|
| $SiO_2$ | % by weight | 14.0 | 14.0 | 11.0 | 11.5 | 11.5 | 11.5 |
| $B_2O_3$ | % by weight | 26.0 | 26.0 | 29.0 | 29.0 | 29.0 | 29.0 |
| $Al_2O_3$ | % by weight | 0.5 | 0.5 | 1.0 | 0.5 | 0.5 | 0.5 |
| $Li_2O$ | % by weight | 2.0 | 2.0 | 2.0 | 2.0 | 2.0 | 2.0 |
| BaO | % by weight | 3.5 | 3.5 | 3.0 | 3.0 | 3.0 | 3.0 |
| CaO | % by weight | 12.0 | 12.0 | 15.5 | 16.5 | 17.5 | 17.5 |
| ZnO | % by weight | 3.0 | 3.0 | 1.0 | 1.0 | 1.0 | 1.0 |
| $La_2O_3$ | % by weight | 24.0 | 24.0 | 22.0 | 25.0 | 25.0 | 25.0 |
| $Gd_2O_3$ | % by weight | 5.0 | 5.0 | 6.0 | 3.0 | 3.0 | 3.0 |
| $Y_2O_3$ | % by weight | 8.5 | 8.5 | 5.0 | 5.0 | 5.0 | 5.0 |
| $Na_2O$ | % by weight | 1.5 | — | — | — | — | — |
| $K_2O$ | % by weight | — | 1.5 | — | — | — | — |
| SrO | % by weight | — | — | 4.0 | — | — | — |
| $ZrO_2$ | % by weight | — | — | — | 3.0 | — | — |
| $Nb_2O_5$ | % by weight | — | — | — | — | 2.0 | — |
| $WO_3$ | % by weight | — | — | — | — | — | 2.0 |
| $Sb_2O_3$ | % by weight | — | — | 0.5 | 0.5 | 0.5 | 0.5 |
| Total | % by weight | 100.0 | 100.0 | 100.0 | 100.0 | 100.0 | 100.0 |
| Conditional Expression (1) | | 0.538 | 0.538 | 0.379 | 0.397 | 0.397 | 0.397 |
| Conditional Expression (2) | | 0.94 | 0.94 | 0.83 | 0.81 | 0.81 | 0.81 |
| nd | — | 1.688 | 1.689 | 1.690 | 1.692 | 1.687 | 1.693 |
| νd | — | 54.5 | 54.5 | 55.1 | 54.5 | 54.5 | 54.5 |
| Tg | °C. | 569 | 569 | 567 | 567 | 566 | 568 |
| Ts | °C. | 632 | 630 | 630 | 628 | 630 | 630 |
| Devitrification (liquid phase temperature L.T) | °C. | 985 | 985 | 985 | 985 | 985 | 985 |
| Hardness to be cloudy | — | A | A | A | A | A | A |

Each of the optical glasses in Examples 1 to 12 contains $SiO_2$, $B_2O_3$, $Al_2O_3$, $Li_2O$, BaO, CaO, ZnO, $La_2O_3$, $Gd_2O_3$ and $Y_2O_3$ in a specific content, each in % by weight, as shown below.
$SiO_2$: 10% or more and 17% or less
$B_2O_3$: 23% or more and 30% or less
$Al_2O_3$: 0.1% or more and 1% or less
$Li_2O$: 2% or more and 3.5% or less
BaO: 1% or more and 4% or less
CaO: 10% or more and 20% or less
ZnO: 0.5% or more and 6% or less
$La_2O_3$: 22% or more and 30% or less
$Gd_2O_3$: 0.5% or more and 7% or less
$Y_2O_3$: 5% or more and 11% or less Further, each of the optical glasses in Examples 7 to 12 contains at least any of $Na_2O$, $K_2O$, SrO, $ZrO_2$, $Nb_2O_5$, and $WO_3$. The content of each component in % by weight is as follows.
$Na_2O$: 1.5%
$K_2O$: 1.5%
SrO: 4%
$ZrO_2$: 3%
$Nb_2O_5$: 2%
$WO_3$: 2%

Each of the optical glasses in Examples 1 to 12 contains 1% by weight or less of $Sb_2O_3$.

Any of the optical glasses in Examples 1 to 12 satisfies the above conditional expressions (1) and (2).

As is apparent from various numerical data shown in Tables 1 and 2, in Examples 1 to 12, refractive index nd as high as 1.68 to 1.70, and high Abbe's number vd exceeding 54 are secured, and glass transition temperature Tg lower than 570° C. is obtained. Further, it is confirmed that cloudiness ascribable to micro-devitrification is difficultly generated even when the glass is retained in a press molding temperature region, liquid phase temperature L.T is suppressed to 990° C. or less, the glass is not vitrified by crystallization in glass manufacturing process, and excellent in quantity productivity.

From these results, the optical glass consisting of the components of the exemplary embodiment is very excellent in the balance of refractive index nd, Abbe's number vd and glass transition temperature Tg, and further, cloudiness ascribable to micro-devitrification in press molding hardly occurs. In addition, the optical glass of the invention is excellent in quantity productivity in glass manufacturing process. That is, it is confirmed that the optical glass in the exemplary embodiment is excellent in quantity productivity, highly precise press molding is possible at a relatively low temperature with the optical glass, and is preferably used as the material of lenses having high optical performances.

The invention has been described with referring to the exemplary embodiments and examples, but the invention is by no means restricted thereto, and various modifications can be made. For example, the components of optical glass are not limited to the values shown in the above examples and other values may be taken.

What is claimed is:

1. An optical glass comprising in % by weight:
10% or more and 17% or less of $SiO_2$;
23% or more and 30% or less of $B_2O_3$;
0.1% or more and 1% or less of $Al_2O_3$;
2% or more and 3.5% or less of $Li_2O$;
1% or more and 4% or less of $BaO$;
10% or more and 20% or less of $CaO$;
0.5% or more and 6% or less of $ZnO$;
22% or more and 30% or less of $La_2O_3$;
0.5% or more and 7% or less of $Gd_2O_3$; and 5% or more and 11% or less of $Y_2O_3$,
wherein the optical glass satisfies the following conditional expressions (1) and (2), $$0.35 < A/B < 0.70 \quad (1)$$

$$0.80 < C/D < 1.0 \quad (2)$$

wherein A is the content in % by the weight of $SiO_2$, B is the content in % by the weight of $B_2O_3$, C is the content in % by the weight in total of $La_2O_3$, $Gd_2O_3$ and $Y_2O_3$ and D is the content in % by the weight in total of $SiO_2$ and $B_2O_3$.

2. The optical glass as claimed in claim 1, which further comprises at least one of $Na_2O$, $K_2O$, $SrO$, $ZrO_2$, $Nb_2O_5$, $WO_3$, and $Sb_2O_3$, wherein the content in % by weight of $Na_2O$ is 0% or more and 3% or less, the content in % by weight of $K_2O$ is 0% or more and 3% or less, the content in % by weight of $SrO$ is 0% or more and 5% or less, the content in % by weight of $ZrO_2$ is 0% or more and 4% or less, the content in % by weight of $Nb_2O_5$ is 0% or more and 3% or less, the content in % by weight of $WO_3$ is 0% or more and 3% or less, and the content in % by weight of $Sb_2O_3$ is 0% or more and 1% or less.

* * * * *